Patented Aug. 21, 1945

2,383,320

UNITED STATES PATENT OFFICE 2,383,320

REACTION OF SATURATED ALIPHATIC CARBOXYLIC ACIDS WITH SULPHURYL CHLORIDE AND PRODUCTS THEREOF

Morris Selig Kharasch, Chicago, Ill., assignor to E. I. du Pont de Nemours & Company, Wilmington, Del., a corporation of Delaware No Drawing. Application December 9, 1940, Serial No. 369,353

14 Claims. (Cl. 260—327)

This invention relates to a process of reacting aliphatic carboxylic acids of at least 3 carbon atoms with sulphuryl chloride and to the products thereof. More particularly it relates to a process of reacting saturated aliphatic monocarboxylic acid compounds containing a chain of at least 2 carbon atoms attached to the carbonyl group with sulphuryl chloride in the presence of actinic light and an organic catalyst.

This invention has for an object to provide a new method of preparing sulpho-derivatives of aliphatic carboxylic acids. A further object is to provide a method of introducing sulpho groups (—SO$_2$Cl, —SO$_2$.OH or —SO$_2$—O—) into aliphatic carboxylic acids which requires economical reactants and simple procedural conditions. A further object is to provide a method of making sulpho derivatives of aliphatic carboxylic acids in good yield. A still further object is to provide a method of preparing anhydrides of sulpho aliphatic carboxylic acids by a single stage. Another object is to develop a new use for sulfuryl chloride. Still other objects are to provide new and useful anhydrides of sulpho aliphatic carboxylic acids and to make a general advance in the chemical arts.

The above objects can be accomplished by the hereinafter described invention which involves reacting a saturated aliphatic carboxylic acid compound having at least two carbon atoms in a chain attached to the carbonyl group, with sulphuryl chloride, under conditions which promote the introduction of a sulpho group (—SO$_2$Cl, —SO$_2$.OH or —SO$_2$—O—)

into the carbon nucleus.

In a more limited sense the invention involves reacting a saturated aliphatic monocarboxylic acid compound containing a chain of at least two carbon atoms attached to the carbonyl group with sulphuryl chloride while subjecting said reactants to actinic light radiations, especially in the presence of an organic catalyst.

The reaction may be carried out in two general ways, one under anhydrous conditions and as a second way in the presence of small amounts of water. When minor amounts of water are present in the system the reaction apparently proceeds through a stage which involves the formation of organic sulphonyl chloride derivatives. These are hydrolyzed to sulphonic acid substituents. Choosing propionic acid in exemplification of the reaction it appears to proceed as follows:

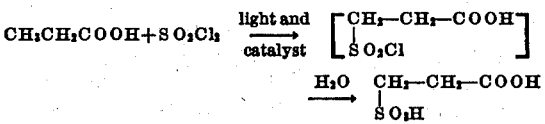

If, however, anhydrous reactants and catalysts are used, the reaction takes another course, again, presumably through the intermediate carboxylic acid sulphonyl chloride. In this case the sulphonyl chloride splits out hydrochloric acid with the carboxyl group and yields a sulphocarboxylic acid anhydride as follows:

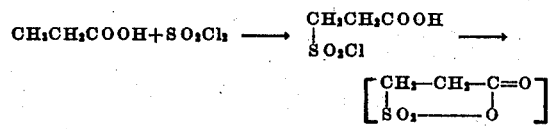

The carboxylic acid sulphonic acids formed can be converted to sulpho carboxylic acid anhydrides if desired by treatment with thionyl chloride as follows:

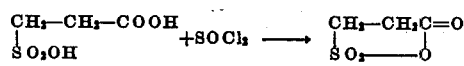

The sulpho carboxylic acid anhydrides which may be obtained in accordance with this invention are valuable intermediates for chemical syntheses. They are especially valuable for reaction with organic compounds containing functional hydrogen atoms such as amines, alcohols, phenols, mercaptans, amides. The anhydrides are in a sense solubilizing agents for such compounds since the reaction products contain free sulphonic acid groups or sulphonic acid salt groups. In addition to the sulpho derivatives minor amounts of chlorinated aliphatic acids are formed in which the chlorine atoms are predominately in the alpha position to the carboxyl group.

The present reaction especially when anhydrous conditions are used is quite surprising and gives unexpected results when one considers prior art chlorination reactions with sulphuryl chloride. The sulpho group enters into the lower aliphatic acids apparently exclusively in the beta position with respect to the carbonyl group, but in longer chain acids as isovaleric and lauric, the position is not beta or gamma, exclusively.

The invention shall be further illustrated but is not intended to be limited by the following examples wherein the parts stated are parts by weight:

EXAMPLE I

One hundred and eighty-five parts of very dry propionic acid (2½ mols) and 135 parts of sulphuryl chloride (1 mol) were mixed and refluxed while exposing the reaction zone to ordinary diffused light until the evolution of gas ceased, which required 1 hour. The excess propionic acid was removed under reduced pressure and the cooled residue treated with a mixture of zenzene and ligroin. A product precipitated which after filtering was found to be extremely hygroscopic and melted at 76–77°. This product is insoluble in ligroin, benzene and chloroform, but extremely soluble in water and alcohol to yield a strongly acid solution and is the anhydride of the following formula:

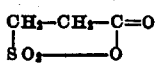

EXAMPLE II

Two tenths of a mol of propionic acid was dissolved in an equimolar quantity of carbon tetrachloride in a "Pyrex" reaction vessel and 4 drops of pyridine added. A solution of 0.275 mol of sulphuryl chloride in an equimolar quantity of carbon tetrachloride was added dropwise over a period of one hour. The reaction zone was irradiated by means of a 300 watt tungsten filament clear glass lamp placed 5 cm. from the walls of the vessel. After all the sulphuryl chloride was added, the reaction mass was stirred for 2 hours and continuously irradiated and solid beta-sulpho-propionic acid separated from the mother liquor on standing overnight at room temperature. The conversion was 81%, and a 77% yield of beta-sulpho-propionic acid, having a M. P. of 102–103° C. was obtained. This beta-sulpho-propionic acid on treatment with thionyl chloride yields the same inner anhydride which was prepared in Example I, using especially dried propionic acid. The barium salt of the sulpho acid crystallized with 5 mols of water and may be dried to anhydrous conditions by heating to 130° for 7 hours at 3 mm.

Analysis

|  | Percent |
|---|---|
| Barium | 47.02 |
| Calc. for Ba($C_3H_4O_5S$) | 47.5 |

EXAMPLE III

Two tenths of a mol of isobutyric acid was dissolved in an equimolar quantity of carbon tetrachloride and treated with 0.275 mol sulphuryl chloride under the conditions outlined in Example II. Four drops of pyridine was added as a catalyst. After the reaction period the reaction mixture was treated with ligroin to cause the precipitation of the anhydride of sulpho isobutyric acid and the mother liquor which contained all the constituents which are soluble in ligroin was decanted. The yield of the inner anhydride of β-sulpho isobutyric acid was 42%. From the mother liquor a 28% yield of alpha chloro isobutyric acid was obtained. The sulpho-isobutyric anhydride thus formed is a syrupy liquid which was identified through its derivatives. The sulpho group was assigned the beta-position because the product does not crystallize with 2 molecules of water as is the case with the isomeric alpha-sulfo-isobutyric acid. The barium salt was dehydrated at 130° C. in seven hours.

Analysis found

|  | Per cent |
|---|---|
| Barium | 39.79 |
| Calc. for Ba($C_4H_6O_5S$)—2½ $H_2O$ barium | 39.4 |

On heating to 180° for 6 hours, the salt was completely dehydrated.

Analysis found

|  | Per cent |
|---|---|
| Barium | 46.3 |
| Calc. for Ba($C_4H_6O_5S$) | 45.3 |

EXAMPLE IV

The beta-sulpho-isobutyric acid prepared by hydrolysis of the anhydride of Example III was reconverted to the beta-sulpho-isobutyric inner anhydride by refluxing with thionyl chloride. This anhydride is a syrupy liquid insoluble in ligroin and was distilled at 3–5 mm. pressure at 135–145° with slight decomposition. The twice distilled substance was a yellowish viscous liquid of the following formula:

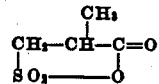

Analysis

|  | Per cent |
|---|---|
| Neutralization equivalent found | 76.2 |
| Theoretical neutralization equivalent | 75 |
| Sulphur | 21.1 |
| Theory sulphur | 21.3 |

EXAMPLE V

Sulpho-normal butyric acid was prepared from normal butyric acid in a manner exactly analogous to that of Example III. The barium salt was made anhydrous by heating in a vacuum at 130° for 7 hours and contained 46.7% barium; theory for Ba($C_4H_6O_5S$) is 45.3%.

The conversion of the sulpho-normal butyric acid to the inner anhydride with thionyl chloride ran smoothly and gave a product which could not be distilled without extensive decomposition. The neutralization equivalent for the inner anhydride was found to be 74.4, theory value—75.

EXAMPLE VI

Beta-sulpho-propionic acid inner anhydride was dissolved in benzene and treated with an excess of aniline. A vigorous reaction occurred and a white solid separated. This was washed with small portions of benzene to remove traces of free aniline and filtered. The product obtained was recrystallized twice from water, and melted sharply at 216° C. On titration with sodium hydroxide using phenolphthalein as indicator, it was noted that free aniline separated as the solution became sufficiently basic, indicating that the product was the aniline salt of the following structure:

$C_6H_5$—$NH_3$—O—$SO_2$—$CH_2CH_2$—CO—NH—$C_6H_5$

Analysis

|  |  |
|---|---|
| Neutralization equivalent found | 320 |
| Calc. for the above product | 332 |

The position of the anilide group was proved to be attached to the carboxyl group by pH determination of the compound. The strength of the acid as shown by a pH determination of a solution of known concentration, indicated that the sulphonic acid group was free.

EXAMPLE VII

Beta-sulpho-isobutyric acid anhydride was condensed with aniline under the conditions used in Example VI and the product obtained was a solid which does not melt but decomposes sharply at 238° C.

Analysis

|  |  |
|---|---|
| Neutralization equivalent found | 329 |
| Nitrogen | 8.25 |
| Theory for $C_{16}H_{20}O_4N_2S$, neutralization equivalent | 336 |
| Nitrogen | 8.33 |

In place of the specific carboxylic acids set forth in the above examples may be substituted other acids with similar results. However, as the length of the chain attached to the carbonyl group increases above 5, the tendency of beta-sulphonic acids to be formed in preponderant amounts changes and the products become more complex, particularly if an excess of sulphuryl chloride to acid is used. The preferred beta-sulpho-carboxylic anhydrides have 3 to 6 carbon atoms inclusive. Suitable additional acids include valeric, caproic, heptylic, caprylic, nonylic, capric, decoic, lauric, myristic, palmitic, margaric and stearic. Mixtures of one or more of the herein described acids may be used. Mixtures of acids such as are obtained by the hydrolysis of natural oils, fats and waxes, e. g. glycerides; mixtures of acids obtained by the oxidation of saturated aliphatic hydrocarbons, petroleum oils and waxes, also have utility. Unsaturated acids such as oleic, which contain a majority of saturated linkages can be similarly reacted.

The invention is not limited to the specific catalysts described in the examples. On the contrary, a large number of compounds or mixtures may be used. Organic nitrogen bases such as mono- and polyaliphatic, aromatic, cycloaliphatic, mixed aliphatic-aromatic, aliphatic-cycloaliphatic, N-heterocyclic amines are preferred. Suitable compounds of this type include:

Pyridine
Quinoline
Quinaldine
Uns.-dimethylethylenediamine
N,N,N',N'-tetramethylhexamethylenediamine
Nicotine
N-dimethyl-C-dimethylglycinenitrile
Hexamethylenediamine
Alpha-aminopyridine
2,6-diaminopyridine
Phenanthroline
Piperidine
Isoquinoline
Octadecylamine
Ethylene diamine
N-dimethyl cyclohexylamine
Dimethylaniline
Tributylamine
Isoamylamine
m-Nitrodimethylaniline Additional representative compounds include the following:

*Carbon, nitrogen and oxygen compounds*

Lauramide
N-(p-methoxybenzyl) lauramide
Butyrolactam
Tetramethylammoniumformate
N,N'disalicylaldiaminoethane
N-(2-ethylhexanylidine)-2-ethylhexylamine
2-amino-2-methylpropanol-1
Dodecyl carbamate
Xylylheptadecylketoxime
Hexamethylenediisocyanate
N-dimethylmethoxyacetamide
Isobutylundecylenamide
Nicotinic amide
Acetamide
Morpholine
Stearyldimethylamineoxide
Pyridinium acethydrazide

*Carbon and phosphorus compounds*

Triphenylphosphine

*Carbon, nitrogen, oxygen and sulphur compounds*

(Trimethylaminoethylstearate) methyl sulphate

*Carbon, nitrogen, and sulphur compounds*

2-mercaptothiazoline
Methallylisothiocyanate
Allylthiourea
Tetramethyl thiuram disulphide
Tetramethyl thiuram monosulphide

*Carbon and oxygen compounds*

Phenylethyleneoxide

*Carbon, oxygen and sulphur compounds*

Anthraquinone-1-sulphonic acid, potassium salt

*Carbon and sulphur compounds*

Thiophenol

The proportions of reactants may be varied over a fairly wide range. In general, however, at least one mol of sulphuryl chloride per mol of acid is desirable. An excess of several mols can be used and from 1 to 1.5 mols are preferred.

The temperature and pressure conditions as previously indicated are not limited to those specifically given in the examples, but may vary widely depending on the particular starting material, nature of the light source, catalyst and pressure selected. Temperatures just above the freezing or solidification points of the reactants up to that at which substantial decomposition of reactants or end products occur can be used. A practical range is from −40° C. to 100° C. and a preferred range from 20 to 85° C. The pressures may vary from ½ atmosphere and below to 10 or more atmospheres.

Organic solvents which are resistant to the reaction of chlorine and bromine and hydrochloric acid are in general suitable for the process. Chlorinated hydrocarbons such as carbon tetrachloride, tetrachloroethane, ethylene dichloride, trichloroethane, pentachloroethane, hexachloroethane, chloroform, dichlorbenzene, etc. are useful. Benzene, toluene, benzine, etc., however, can be used alone or in admixture. In certain instances the catalysts have a dual function and act as a solvent or diluent in addition to promoting the reaction. Pyridine, picoline, lepidine, quinoline and quinaldine are in this category and constitute very practical catalysts.

Various sources and wave lengths of light can be used to irradiate the reaction zone and reactants, e. g. direct sunlight, diffused daylight, ultraviolet light, including incandescent lamps, clear, frosted or colored glass lamps, rare gas lamps, fluorescent lamps, mercury vapor lamps, carbon arcs, including metal cored and metal salt cored carbon arcs, etc. Light screens may be used which let certain wave lengths only irradiate the reaction zone. A quartz window or reaction vessel is quite practical. A practical range of wave lengths varies from about 1800 to 7000 A.

In the aspect of the invention which has two stages and involves the preparation of sulphoanhydrides, the sulphocarboxylic acids can be converted to the anhydrides with other strong dehydrating agents such as phosphorus trichloride, phosphorus pentachloride, etc.

This invention is of considerable utility as is apparent from the above description. It provides a new use for sulfuryl chloride and aliphatic carboxylic acid compounds. It enables one to prepare saturated aliphatic carboxylic acid compounds with sulpho groups ($-SO_2Cl$, $-SO_2.OH$ or $-SO_2O-$) in a simple and economical manner. It provides a new class of anhydrides which are of considerable use in organic syntheses. The anhydrides can be used to solubilize a wide variety of other compounds in a simple and easily controllable manner.

This application is a continuation-in-part of my copending application, Serial No. 291,515, filed August 23, 1939.

As many apparently widely different embodiments of this invention may be made without departing from the spirit and scope thereof, it is to be understood that this application is not limited to the specific embodiments herein except as defined by the appended claims.

What is claimed is:

1. A process which comprises reacting an unsubstituted saturated aliphatic carboxylic acid compound containing a chain of at least 2 carbon atoms attached to the carbonyl group, in the liquid phase, with sulphuryl chloride in the presence of actinic light, under conditions such that not more than minor amounts of water are present.

2. A process which comprises reacting an unsubstituted saturated aliphatic, monocarboxylic acid compound containing a chain of 2 to 5 carbon atoms attached to the carbonyl group, in the liquid phase and at a temperature from —40° to 100° C., with sulphuryl chloride in the presence of actinic light and an organic catalyst, under conditions such that not more than minor amounts of water are present.

3. A process as set forth in claim 2 wherein the catalyst is an organic nitrogenous base.

4. A process which comprises reacting an unsubstituted saturated aliphatic monocarboxylic acid containing a chain of 2 to 5 carbon atoms attached to the carboxy group, in the liquid phase at a temperature from 20° to 85° C., with approximately an equimolecular proportion of sulphuryl chloride in the presence of actinic light and an organic nitrogenous base, under conditions such that not more than minor amounts of water are present.

5. A process which comprises reacting an unsubstituted saturated aliphatic carboxylic acid containing a chain of at least 2 carbon atoms attached to the carboxy group with approximately an equimolecular proportion of sulphuryl chloride in the liquid phase at a temperature from 20° to 85° C. under conditions of reflux in the presence of actinic light and an organic nitrogenous base, reacting the aliphatic carboxylic acid sulphonic acid formed with a strong dehydrating agent and recovering a saturated sulpho aliphatic carboxylic acid anhydride.

6. The process which comprises reacting propionic acid with sulphuryl chloride in the liquid phase under conditions of reflux in the presence of actinic light and an organic catalyst, and reacting the beta-sulphopropionic acid formed with a strong dehydrating agent.

7. In a process of making anhydrides, the step which comprises reacting beta-sulphopropionic acid with thionyl chloride.

8. The process which comprises reacting isobutyric acid with liquid sulphuryl chloride under conditions of reflux in the presence of actinic light and an organic catalyst, under conditions such that not more than minor amounts of water are present.

9. In a process of making anhydrides, the step which comprises reacting beta-sulphoisobutyric acid with thionyl chloride.

10. As new products, anhydrides of the general formula:

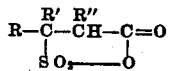

wherein R, R' and R" are members of the group consisting of hydrogen and alkyl radicals.

11. As new products, anhydrides of the general formula:

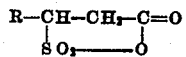

wherein R is a member of the group consisting of hydrogen and alkyl.

12. As a new product the anhydride of the formula:

13. As a new product the anhydride of the formula:

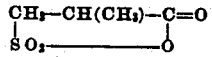

14. A process which comprises reacting under anhydrous conditions a saturated aliphatic monocarboxylic acid containing a chain of 2 to 5 carbon atoms attached to the carboxyl group with approximately an equimolecular proportion of sulphuryl chloride in the liquid phase in the presence of actinic light and an organic nitrogenous base.

MORRIS SELIG KHARASCH.